United States Patent [19]

Schoch, Jr. et al.

[11] Patent Number: 5,662,879
[45] Date of Patent: Sep. 2, 1997

[54] METHOD FOR PREPARATION OF FERRITE POWDERS AT ROOM TEMPERATURE

[75] Inventors: Karl F. Schoch, Jr., Pittsburgh; Theodore R. Vasilow, Irwin; Daryl V. Stough, Huntingdon, all of Pa.

[73] Assignee: Northrop Grumman Corporation, Los Angeles, Calif.

[21] Appl. No.: 639,642

[22] Filed: Apr. 29, 1996

[51] Int. Cl.$^6$ .................................................. C01G 49/00
[52] U.S. Cl. ............................................................ 423/594
[58] Field of Search ............................................ 423/594

[56] References Cited

U.S. PATENT DOCUMENTS

| | | | |
|---|---|---|---|
| 3,822,210 | 7/1974 | Iwase et al. | 423/594 |
| 4,680,130 | 7/1987 | Hibst | 423/594 |
| 4,764,429 | 8/1988 | Mair | 428/403 |
| 5,078,984 | 1/1992 | Iwasaki et al. | 423/594 |

FOREIGN PATENT DOCUMENTS

| | | | |
|---|---|---|---|
| 56-05330 | 1/1981 | Japan | 423/594 |
| 60-115203 | 6/1985 | Japan | 423/594 |
| 60-152011 | 8/1985 | Japan | 423/594 |
| 5-243033 | 9/1993 | Japan | 423/594 |
| 1752521 | 8/1992 | U.S.S.R. | 423/594 |

*Primary Examiner*—Steven Bos
*Attorney, Agent, or Firm*—Walter G. Sutcliff

[57] ABSTRACT

A method for precipitating ferrite at room temperature which involves dissolving metal salts in deaerated water, using a base solution to precipitate metal hydroxides, adding an oxidizing agent that has a standard reduction potential greater than 1.229 V versus standard hydrogen electrode. The oxidizing agent further preferably has a standard reduction potential less than 1.8 V versus standard hydrogen electrode. The oxidizing agent is preferably one of hydrogen peroxide, ammonium peroxydisulfate, ozone, nitrous acid, NO, and $N_2O$. The base is preferably ammonium hydroxide.

3 Claims, 3 Drawing Sheets

METHOD FOR PREPARATION OF FERRITE POWDERS AT ROOM TEMPERATURE

BACKGROUND OF THE INVENTION

1. Field of the Invention

The present invention relates generally to methods for preparing ferrite powders and more particularly to methods for preparing ferrite powders which may be performed at room temperature.

2. Background of the Invention

The prior methods known in the industry for the preparation of ferrite powders are generally based on two different techniques. One technique is the high temperature processing of metal salts or oxides, and the other technique is coprecipitation.

The high-temperature technique for ferrite powder preparation is the traditional ceramic processing method. In this process, metal oxide or metal carbonate powders are mixed together in a ball mill and are then calcined at approximately 1200°–1400° C. to form the crude ferrite. This solid mass is subsequently ground, pressed and sintered at approximately 1200°–1400° C. or higher to form the final, fired parts.

This process suffers from a number of potential drawbacks. The grinding steps may introduce impurities and result in a broad distribution of particle sizes. Further, dry pressing can introduce porosity in the sintered parts. While this method may be acceptable for producing materials for some applications, there are other, more demanding applications that require low impurity content, uniform, small grain size, and low porosity.

For more demanding applications that require low impurity content, uniform, small grain size and low porosity, coprecipitation has been the method of choice. Prior coprecipitation techniques have included the base precipitation of metal hydroxides from sulfate solution and the precipitation of metal oxalates from acetate solutions.

Coprecipitation of ferrites through the base precipitation of metal hydroxides involves dissolution of metal salts (sulfates, halides, nitrates, etc.) in deaerated water. Dissolved oxygen must be removed from the water in order to prevent premature oxidation of Fe(II) to Fe(III). This solution is heated above 60° C. and an aqueous base is added to precipitate the metal hydroxides as a gel. Many bases are effective, including NaOH, and $NR_4OH$ (R=methyl, ethyl, butyl). Oxygen has been used as the oxidizing agent. Thus, following precipitation, oxygen is bubbled through the reaction mixture, resulting in precipitation of finely dispersed ferrite powder. In general, the ratio of metal ions in the produced powder corresponds to the ratio of metal ions in the initial solution. This process may be summarized in the equation provided in FIG. 1, in which $R=CH_3$, $C_4H_9$ and the $O_2$ flow rate=4–12 standard liters per hour.

The following is a more rigorous description of the prior art precipitation process using various starting materials and oxygen as the oxidizing agent. Each process occurs in two steps: precipitation of a mixture of hydroxides followed by oxidation to ferrite. In these equations, R is an alkyl, such as methyl, ethyl or butyl, and X is a halide, such as fluoride, chloride, bromide or iodide.

sulfates:

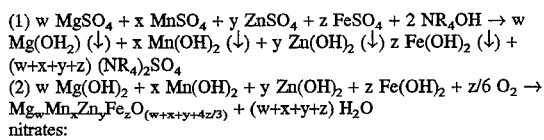

nitrates:

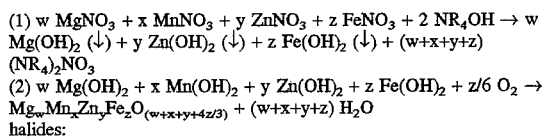

halides:

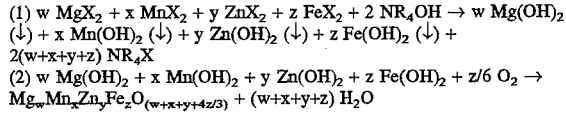

This coprecipitation process typically produces a submicron powder with narrow particle size distribution and very low impurity content (dependent on the starting materials). The problems with this process pertain to dispersion of the oxygen gas, especially in large volumes of solution, and complete removal of residual base from the precipitate. In particular, dispersion of oxygen in the solution is optimized by using a glass frit or "dispersion stone", which will break the gas stream into many small bubbles. This process creates considerable foaming action to the metal hydroxide gel. When carried out on a large (i.e., greater than 10 liter) scale, the foam can be difficult to contain. Complete removal of base from the product requires extensive washing as the alkyl ammonium hydroxides are not volatile and therefore are not readily removed by evaporation. Since the powders produced by this process are very fine, separation of powder from the liquid phase can be time consuming either by filtration or by centrifugation.

As noted above, another approach to producing ferrites by coprecipitation involves precipitation of a solid solution of metal oxalate salts from acetic acid solution. In this approach, metal acetates are dissolved in refluxing aqueous acetic acid. The addition of oxalic acid results in immediate, quantitative precipitation of the mixed oxalate. This oxalate is converted to the corresponding ferrite by calcining at temperatures greater than 575° C. The calcination step must be carefully controlled to accomplish the conversion to the ferrite without sintering of the particles. This process may be summarized by the equation provided in FIG. 2.

When carefully carried out, this procedure also results in a sub-micron powder with very low impurity content. This process has the drawbacks of requiring high temperatures for calcination and close control of the calcination process. Calcination is not required in the sulfate/hydroxide process.

U.S. Pat. No. 5,078,984 to Iwasaki et al. describes precipitation of doped barium ferrite platelets from a solution of hydroxides. Iwasaki et al. is concerned with making platelets having an average particle size of from 0.03 µm to 0.1 µm, thus, there are several differences between the Iwasaki invention and the present invention. For example, the Iwasaki reference teaches of precipitating the metal hydroxides at pHs of at least 12. Further, Iwasaki et al heat their hydroxide dispersion to temperatures of between 50° C. and boiling and also add a carbonating agent to the reaction mixture. Further, Iwasaki et al. use Fe(III) salts as the iron containing starting material. Significantly, Iwasaki et al. complete the crystallization of their product by calcining at temperatures of between 700° C. and 900° C.

U.S. Pat. No. 4,764,429 to Mair is directed toward preparation of two layer particles, 5-100 nm having a core of $Fe_2O_3$ and a shell of a basic metal hydroxide sulfate. While precipitation under the teaching of Mair is also carried out at elevated pH, Mair requires several special steps in order to produce the two layer particles. Thus, the differences between Mair and the present invention include that Mair adds 5-20% by volume of an alcohol to the dispersion of hydroxides prior to isolating the product. The core $Fe_2O_3$ particles used in Mair are prepared by the prior art method using NaOH or KOH and an inert gas. Alkali metal hydroxides are undesirable in the device of the present invention because every effort is made to rigorously exclude alkali metals from the product in order to optimize the magnetic properties of the ferrite particles.

Thus, a method for preparing ferrite powders is needed which may be carried out at room temperature and permits the easy removal of the base, preferably by evaporation rather than washing. Such a method would substantially reduce the time and labor involved in the sulfate/hydroxide precipitation method. Such a method must also be able to produce powders with low impurity content, uniform, small grain size and low porosity.

SUMMARY OF THE INVENTION

This invention describes improvements to the coprecipitation method directed toward the use of oxidizing agents and bases. These improvements make it possible to carry out the coprecipitation reaction at room temperature, simplify scale up, simplify washing of the powder, and eliminate waste products requiring special disposal. These improvements are accomplished without degrading the performance of the powders thus produced.

The preferred means to precipitate the ferrites is through base precipitation of metal hydroxides in an aqueous solution. This process entails dissolving metal salts in deaerated water and adding an aqueous base to precipitate the metal hydroxides as a gel. Then, an oxidizing agent is added to the reaction mixture to precipitate the ferrite powder. The preferred oxidizing agent is one that is more reactive than oxygen, such as $H_2O_2$ or $(NH_4)_2S_2O_8$, which allows oxidation to be carried out at room temperature. Room temperature is normally in the range of 15° to 30° C., but could be higher or lower in certain manufacturing environments so that a range of 10° to 45° C. is the preferred temperature range.

The present invention thus involves two significant innovations. First, molecular oxygen is replaced as the oxidizing agent with more reactive oxidizers, such as $H_2O_2$ or $(NH_4)_2S_2O_8$. Other oxidizing agents having reduction potentials greater than or equal to that of oxygen gas should also be effective. $H_2O_2$ and $(NH_4)_2S_2O_8$ are the preferred oxidizing agents because the products of the reaction are present in the reaction mixture already. Other oxidizing agents could leave residual transition elements behind with consequent effects on the magnetic or dielectric properties of the product. Second, using the preferred oxidizing agents, the reaction can be carried out at ambient temperature, which permits use of $NH_4OH$ as the base. Typical chemical reactions occurring in this process are:

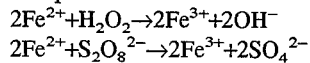

$2Fe^{2+} + S_2O_8^{2-} \rightarrow 2Fe^{3+} + 2SO_4^{2-}$

An overall reaction scheme is:

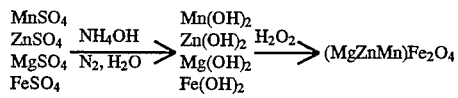

The following is a more rigorous description of the preferred precipitation process using various starting materials and using either $(NH_4)_2S_2O_8$ or $H_2O_2$ as the oxidizing agent. Note that each process occurs in two steps: precipitation of a mixture of hydroxides followed by oxidation to ferrite. In these equations, X=halide, such as fluoride, chloride, bromide or iodide.

Balanced equations for the present invention are as follows (with $(NH_4)_2S_2O_8$ oxidizer):

--- sulfates/with $(NH_4)_2S_2O_8$ oxidizer:

(1) w $MgSO_4$ + x $MnSO_4$ + y $FeSO_4$ + 2 $NH_4OH$ → w $Mg(OH)_2$ (↓) + x $Mn(OH)_2$ (↓) + y $Zn(OH)_2$ (↓) + z $Fe(OH)_2$ (↓) + (w+x+y+z) $(NH_4)_2SO_4$ (2) w $Mg(OH)_2$ + x $Mn(OH)_2$ + y $Zn(OH)_2$ + z $Fe(OH)_2$ + z $(NH_4)_2S_2O_8$ → $Mg_wMn_xZn_yFe_zO_{(w+x+y+3z/2)}$ 4(w+x+y+z/2) $H_2O$ + z$H_2SO_4$ nitrates/with $(NH_4)_2S_2O_8$ oxidizer:

(1) w $MgNO_3$ + x $MnNO_3$ + y $ZnNO_3$ + z $FeNO_3$ + 2 $NH_4OH$ → w $Mg(OH)_2$ (↓) + x $Mn(OH)_2$ (↓) + y $Zn(OH)_2$ (↓) + z $Fe(OH)_2$ (↓) + (w+x+y+z) $(NH_4)_2NO_3$ (2) w $Mg(OH)_2$ + x $Mn(OH)_2$ + y $Zn(OH)_2$ + z $Fe(OH)_2$ + z $(NH_4)_2S_2O_8$ → $Mg_wMn_xZn_yFe_zO_{(w+x+y+3z/2)}$ + 4 (w+x+y+z/2) $H_2O$ + z$H_2SO_4$ halides/with $(NH_4)_2S_2O_8$ oxidizer:

-continued

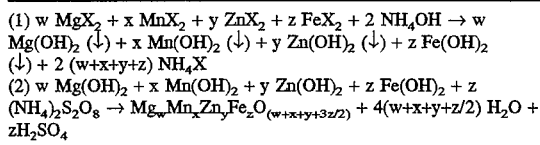

(1) w MgX$_2$ + x MnX$_2$ + y ZnX$_2$ + z FeX$_2$ + 2 NH$_4$OH → w Mg(OH)$_2$ (↓) + x Mn(OH)$_2$ (↓) + y Zn(OH)$_2$ (↓) + z Fe(OH)$_2$ (↓) + 2 (w+x+y+z) NH$_4$X
(2) w Mg(OH)$_2$ + x Mn(OH)$_2$ + y Zn(OH)$_2$ + z Fe(OH)$_2$ + z (NH$_4$)$_2$S$_2$O$_8$ → Mg$_w$Mn$_x$Zn$_y$Fe$_z$O$_{(w+x+y+3z/2)}$ + 4(w+x+y+z/2) H$_2$O + zH$_2$SO$_4$

Balanced equations for the present invention are as follows (with H$_2$O$_2$ oxidizer):

sulfates/with H$_2$O$_2$ oxidizer:

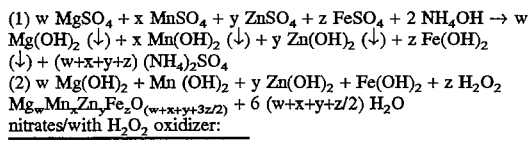

(1) w MgSO$_4$ + x MnSO$_4$ + y ZnSO$_4$ + z FeSO$_4$ + 2 NH$_4$OH → w Mg(OH)$_2$ (↓) + x Mn(OH)$_2$ (↓) + y Zn(OH)$_2$ (↓) + z Fe(OH)$_2$ (↓) + (w+x+y+z) (NH$_4$)$_2$SO$_4$
(2) w Mg(OH)$_2$ + Mn (OH)$_2$ + y Zn(OH)$_2$ + Fe(OH)$_2$ + z H$_2$O$_2$ Mg$_w$Mn$_x$Zn$_y$Fe$_z$O$_{(w+x+y+3z/2)}$ + 6 (w+x+y+z/2) H$_2$O nitrates/with H$_2$O$_2$ oxidizer:

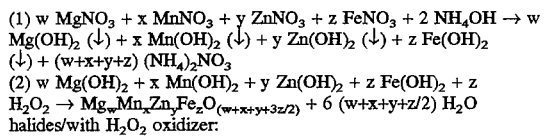

(1) w MgNO$_3$ + x MnNO$_3$ + y ZnNO$_3$ + z FeNO$_3$ + 2 NH$_4$OH → w Mg(OH)$_2$ (↓) + x Mn(OH)$_2$ (↓) + y Zn(OH)$_2$ (↓) + z Fe(OH)$_2$ (↓) + (w+x+y+z) (NH$_4$)$_2$NO$_3$
(2) w Mg(OH)$_2$ + x Mn(OH)$_2$ + y Zn(OH)$_2$ + z Fe(OH)$_2$ + z H$_2$O$_2$ → Mg$_w$Mn$_x$Zn$_y$Fe$_z$O$_{(w+x+y+3z/2)}$ + 6 (w+x+y+z/2) H$_2$O halides/with H$_2$O$_2$ oxidizer:

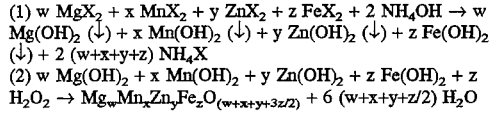

(1) w MgX$_2$ + x MnX$_2$ + y ZnX$_2$ + z FeX$_2$ + 2 NH$_4$OH → w Mg(OH)$_2$ (↓) + x Mn(OH)$_2$ (↓) + y Zn(OH)$_2$ (↓) + z Fe(OH)$_2$ (↓) + 2 (w+x+y+z) NH$_4$X
(2) w Mg(OH)$_2$ + x Mn(OH)$_2$ + y Zn(OH)$_2$ + z Fe(OH)$_2$ + z H$_2$O$_2$ → Mg$_w$Mn$_x$Zn$_y$Fe$_z$O$_{(w+x+y+3z/2)}$ + 6 (w+x+y+z/2) H$_2$O

This process has several advantages over other coprecipitation methods for preparing these materials. For example, this reaction occurs rapidly at room temperature whereas oxidation using oxygen occurs above 60° C. and oxalate formation occurs in refluxing acetic acid. The fact that these oxidizing agents (H$_2$O$_2$ and (NH$_4$)$_2$S$_2$O$_8$) are added in solution rather than by bubbling gas through the solution permits more complete control over the reaction conditions. In particular, the reaction rate can be adjusted by changing the concentration of the reactants. Scaling up this type of process is simpler than one involving dispersion of a gas as foaming of the reaction mixture is essentially eliminated. In fact, this type of process could be performed as a continuous process, mixing the two reactant streams, instead of one large batch which is typical. This process could also be used in preparation of ferrite thin films.

Other advantages of this process pertain to the work-up following the reaction. One of the problems with the prior method using alkyl ammonium hydroxide is that complete removal of the excess base can be quite difficult. The use of NH$_4$OH as the base is possible because the peroxide reaction works at room temperature. The use of NH$_4$OH makes base removal trivial because of the volatility of NH$_3$ under ambient conditions. An additional consequence of this simpler work-up is the elimination of hazardous waste streams containing tetraalkylamines which require special disposal.

While the oxalate route avoids many of the disadvantages of the base precipitation method, there is an additional step of calcining the mixed oxalates at >575° C. to form the ferrite before tape formulating can be carried out. The method described in the present invention requires relatively low temperature drying (200° C.) instead of this additional calcination step.

Other objects and advantages of the invention will become apparent from a description of certain present preferred embodiments thereof.

DETAILED DESCRIPTION OF TEE PREFERRED EMBODIMENTS

The present invention involves dissolving metal salts (sulfates, nitrates, etc.) in deaerated water and using a base solution to precipitate metal hydroxides. Then, an oxidizing agent that is more reactive than oxygen, i.e., that has a Standard Reduction Potential greater than that of oxygen is added to the mixture. Oxygen has a Standard Reduction Potential of approximately 1.229 volts (versus standard hydrogen electrode). Therefore, hydrogen peroxide, having a Standard Reduction Potential of 1.776 volts, would be a desired oxidizing agent. Other oxidizing agents which may be used include ammonium peroxydisulfate, ozone, nitrous acid, NO and N$_2$O. However, if an oxidizing agent is selected that is too reactive, i.e., has a Standard Reduction Potential of approximately 1.8 or greater, the ferrite formation may be more difficult to control. A very reactive oxidizing agent would cause a reaction locally where it is added to the reaction mixture, but would not disperse significantly before being consumed. Dilution of such a reagent would reduce its reactivity by reducing its local concentration and thereby permit its effective use.

The use of oxidizing agents more reactive than oxygen allows oxidization to occur at room temperature (15°–30° C.), which allows the use of different base solutions for use in the initial base precipitation. A preferred base which may be used in the room-temperature process of the present invention is ammonium hydroxide, $NH_4OH$. When ammonium hydroxide is used as the base at elevated temperatures in the prior art techniques, the ammonia gas is evolved and, therefore, the pH changes throughout the oxidation process. Precise control of pH is necessary in order to control the composition of the precipitate because the solubility of the various metal hydroxides are very sensitive to pH. Since the precipitation is performed over several hours, the changing pH causes the composition of the product to change. Thus, at higher temperatures, $NH_4OH$ is not readily used and the prior art has used $NR_4OH$ as the base (where R=alkyl, such as methyl, ethyl or butyl). However, $NR_4OH$ is relatively difficult to remove from the resulting powder. This is avoided using a room temperature process.

The presently described precipitation process results in a fine powder suspended in the solution which is then separated by filtration or centrifugation. Any base that remains on the powder must be removed. The techniques of the prior art required removal of the base by washing and/or heating the powder. The use of ammonium hydroxide as the base is desirable because it is relatively easy to remove once the reaction is complete. The ammonium hydroxide simply evaporates at room temperature.

EXAMPLE

Preparation of $(Mg, Zn, Mn) Fe_2O_4$.

Figure 1:
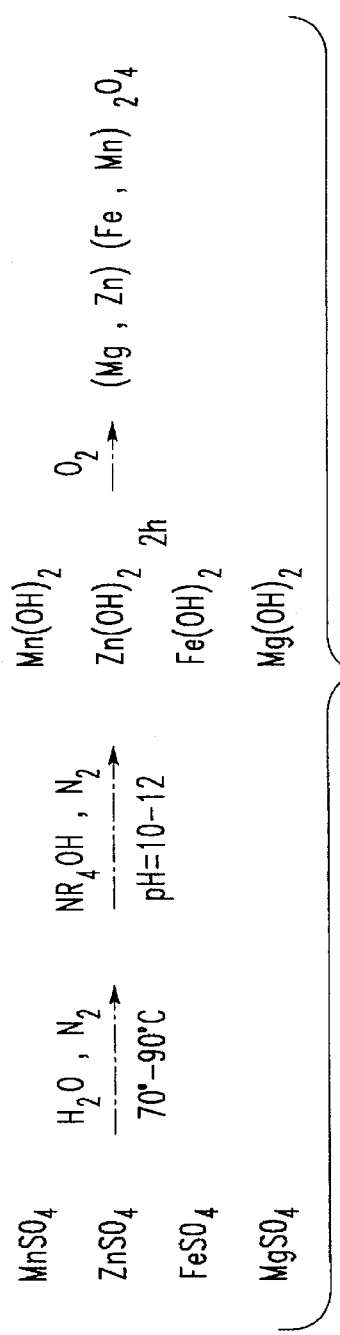
FIG. 1 depicts the chemical process of coprecipitation of ferrites through the base precipitation of metal hydroxides of the prior art.
Figure 2:
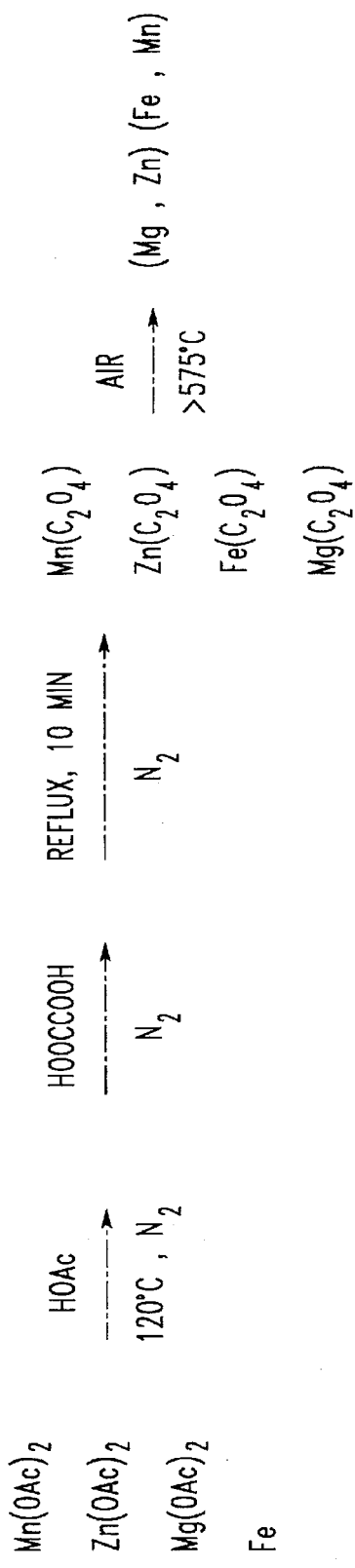
FIG. 2 depicts the chemical process of precipitation of metal oxalates from acetate solution of the prior art.
Figure 3:
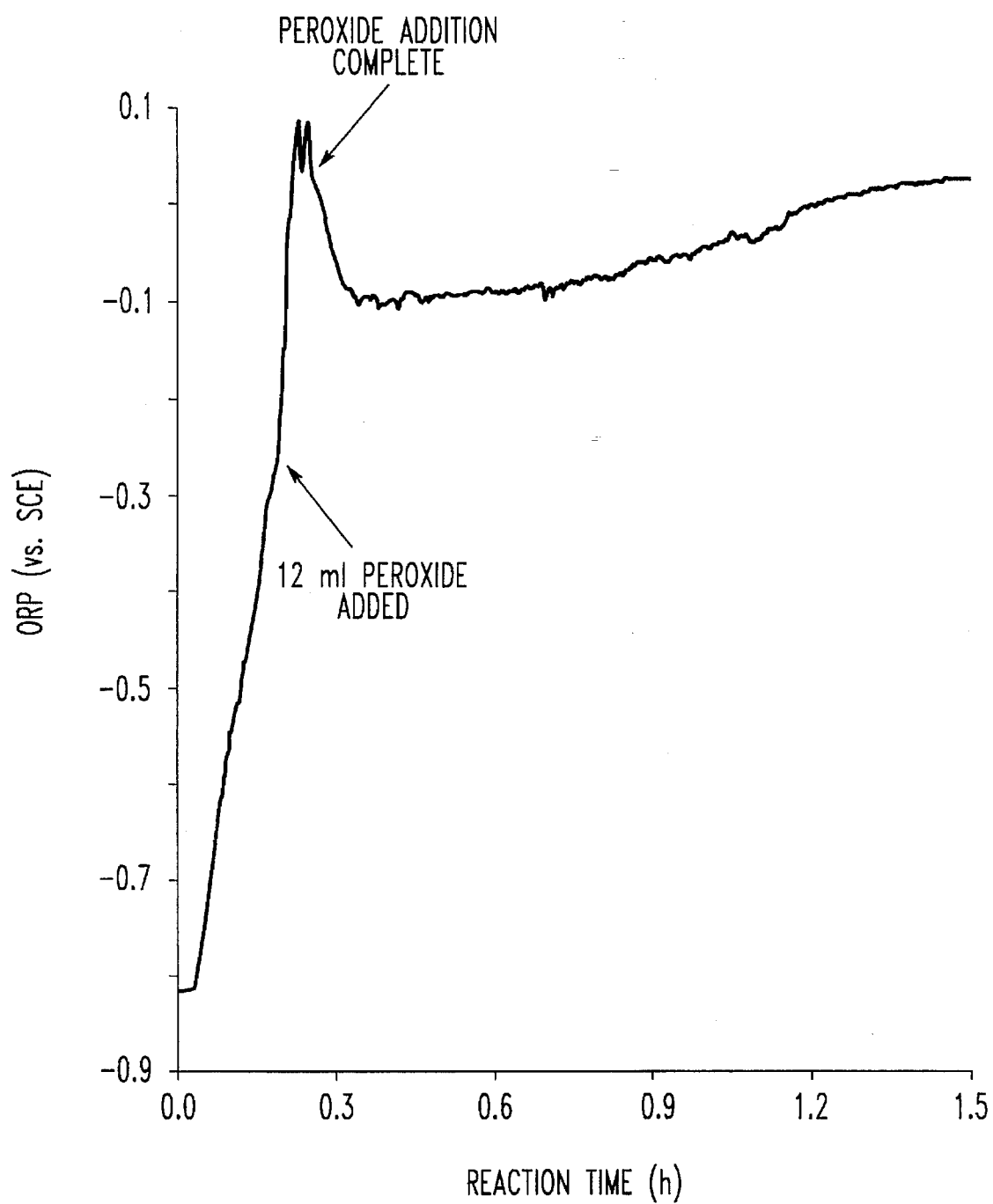
FIG. 3 shows the oxidation-reduction potential (ORP) Of reaction mixture during and after addition of 15 ml of 30% H$_2$O$_2$ (measured versus saturated calumel electrode).

The following metal sulfates were dissolved under nitrogen in 400 ml deaerated water at room temperature (25° C.): 33.56 g (0.1362 mol) $MgSO_4 \cdot 7H_2O$; 2.64 g (0.0147 mol) $ZnSO_4 \cdot H_2O$; 2.78 g (0.0164 mol) $MnSO_4 \cdot H_2O$; 54.83 g (0.1972 mol) $FeSO_4 \cdot 7H_2O$. All metal salts were ACS reagent grade. The hydroxides were precipitated as a gel by adding 49 ml of deaerated concentrated $NH_4OH$. The pH was 9.0. To this solution, 15 ml of deaerated 30% aqueous $H_2O_2$ Was added dropwise. There was an immediate darkening of the solution from pale green through dark blue/black to brown as the peroxide was added. Monitoring the Oxidation-Reduction Potential (ORP) of the solution using Pt and calomel electrodes permitted determination of the end point of the reaction. The ORP value increased from –0.8 V to –0.26 V (versus saturated calumel) as the $H_2O_2$ was added and then rose suddenly to 0.0 V after 12 ml was added as shown in FIG. 3. No further large changes in ORP were observed during addition of the balance of the $H_2O_2$ or during the subsequent hour of reaction. After an hour, the solution was filtered and washed with 1000 ml water. There was no ammonia odor detectable after washing. The filtrate was colorless throughout.

Figure 4:
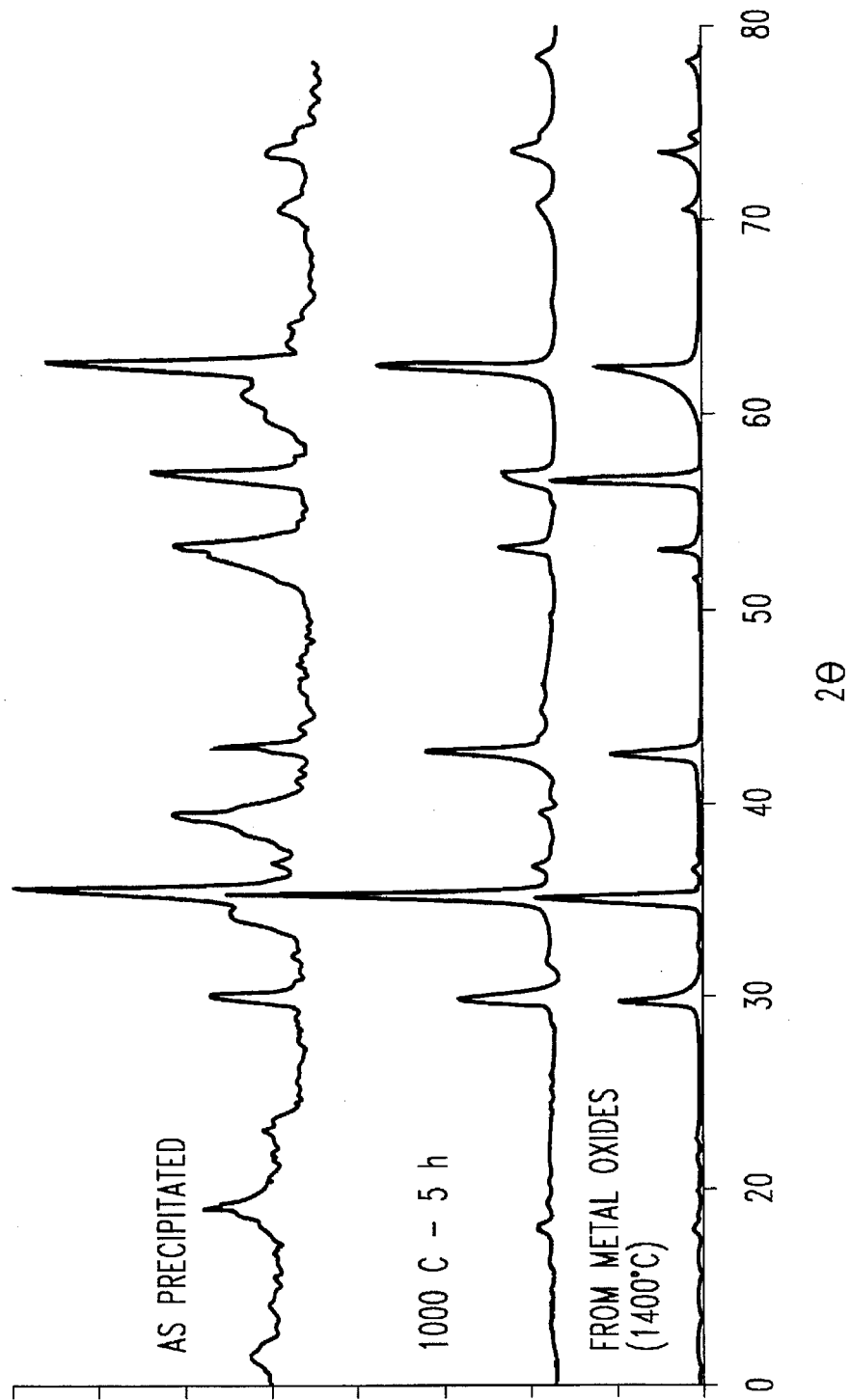
FIG. 4 shows the X-ray diffraction pattern of the preferred ferrite compound to traditionally prepared ferrite as a measure of relative intensity versus 2 θ.

X-ray diffraction Shows that the initial material is not crystallized as much as desired. However, after sintering in air at 1000° C. for five hours, a single-phase ferrite is formed. FIG. 4 shows the X-ray diffraction pattern for a ferrite prepared using our process (as precipitated and after sintering at 1000° C. for 5 h) and the same ferrite composition prepared by traditional ceramic processing starting with metal oxides. The peaks in an X-ray diffraction pattern correspond to planes of symmetry within the crystal lattice of the material in question. Thus if two materials have the same crystal structure and atoms of the same size, their X-ray diffraction patterns will be the same. This figure shows that our chemical precipitation method can produce a ferrite having the same composition and crystal structure as one produced by traditional ceramic methods. An important advantage of chemically produced powder is that the product is formed at much low temperature than is required when starting from metal oxides using traditional ceramic methods (1400° C.). The chemically prepared powder is thus compatible with low melting metals, such as gold, silver or copper. This characteristic is an important consideration in the fabrication of devices made using printed metal pastes for cofiring with these materials. Both diffraction patterns are comparable, showing that both methods produce a ferrite having the same crystal structure.

The surface area of the powder can be controlled by varying the concentration of the reactants. We found that using 200 ml of water to dissolve the sulfate salts rather than 400 ml cited above reduced the surface area from 170 $m^2/g$ to 150 $m^2/g$. The surface area of the powder is a critical parameter in processing the powder as a tape and in sintering the powder or tape into a fired piece. While processing the powder in tape form is the preferred method, these powders can be fabricated into shapes by other common means, such as pressing, extrusion, slip casting and injection molding.

While certain present preferred embodiments have been shown and described, it is distinctly understood that the invention is not limited thereto but may be otherwise embodied within the scope of the following claims.

We claim:

1. A method for producing a ferrite at room temperature comprising the steps of:

dissolving metal salts in deaerated water sufficient for forming a ferrite;

adding thereto a base solution to precipitate metal hydroxides;

adding an oxidizing agent to the reaction mixture of metal salts and base solution, said oxidizing agent being selected from the group consisting of hydrogen peroxide, ammonium peroxydisulfate, ozone, nitrous acid, NO, and $N_2O$ to obtain a suspension of ferrite powder in solution; and separating said ferrite powder from said solution.

2. The method of claim 1 wherein the base is ammonium hydroxide.

3. A method for producing a ferrite at room temperature comprising the steps of:

dissolving metal salts selected from the group consisting of sulfates, halides, and nitrates in deaerated water sufficient for forming a ferrite;

adding thereto a base solution of ammonium hydroxide to precipitate metal hydroxides;

adding an oxidizing agent to the reaction mixture of metal salts and base solution, said oxidizing agent being selected from the group consisting of hydrogen peroxide, ammonium peroxydisulfate, ozone, nitrous acid, NO, and $N_2O$ to obtain a suspension of ferrite powder in solution; and separating said ferrite powder from said solution.

* * * * *